United States Patent
Anudeep et al.

(10) Patent No.: US 12,012,508 B2
(45) Date of Patent: Jun. 18, 2024

(54) MODIFIED STARCH COMPOSITION

(71) Applicant: PHITONS BIOENGINEERING PRIVATE LIMITED, Bangalore (IN)

(72) Inventors: Sandanamudi Anudeep, Mysore (IN); Shiva Subramanian, Bangalore (IN); Rani KC, Mysore (IN)

(73) Assignee: PHITONS BIOENGINEERING PRIVATE LIMITED, Bangalore (IN)

( * ) Notice: Subject to any disclaimer, the term of this patent is extended or adjusted under 35 U.S.C. 154(b) by 0 days.

(21) Appl. No.: 18/272,534

(22) PCT Filed: Jan. 13, 2022

(86) PCT No.: PCT/IB2022/050243
§ 371 (c)(1),
(2) Date: Jul. 14, 2023

(87) PCT Pub. No.: WO2022/153202
PCT Pub. Date: Jul. 21, 2022

(65) Prior Publication Data
US 2024/0034860 A1 Feb. 1, 2024

(30) Foreign Application Priority Data
Jan. 14, 2021 (IN) .............................. 202141001725

(51) Int. Cl.
*C08L 3/04* (2006.01)
*C08K 5/053* (2006.01)
*C08J 5/18* (2006.01)

(52) U.S. Cl.
CPC ............ *C08L 3/04* (2013.01); *C08K 5/053* (2013.01); *C08J 5/18* (2013.01); *C08J 2303/04* (2013.01)

(58) Field of Classification Search
None
See application file for complete search history.

(56) References Cited

U.S. PATENT DOCUMENTS

2009/0324917 A1 12/2009 Wang et al.

OTHER PUBLICATIONS

Gonzalez-Seligra, Influence of extrusion process conditions on starch film morphology, LWT—Food science and technology, 84, pp. 520-528 (Year: 2017).*
Chi, the influence of citric acid, glycerol, and ph on crosslinking and their effects on the morphology, mechanical and thermal properties of tapioca starch films (Year: 2019).*
Van Der Burgt et al., "The Influence of Plasticizer on Extruded Thermoplastic Starch" Journal of Vinyl & Additive Technology, vol. 2 Issue 2 (Jun. 1996); pp. 170-174.

(Continued)

*Primary Examiner* — Stefanie J Cohen
(74) *Attorney, Agent, or Firm* — Klarquist Sparkman, LLP

(57) ABSTRACT

The present disclosure relates to a modified starch composition. Said modified starch composition comprises starch and a compatibilizing agent selected from the group consisting of glycerol, glycerin, sorbitol and a combination thereof in a w/w ratio of 2:1 to 4:1, wherein the modified starch composition has a solubility index of less than 15% in water at a temperature of about 80° C., and wherein the thermogravimetric analysis of the modified starch composition shows a characteristic peak at a temperature in the range of 120° C. to 180° C.

12 Claims, 3 Drawing Sheets

(56) References Cited

OTHER PUBLICATIONS

Nogueira et al., "Extraction and characterization of arrowroot (*Maranta arundinaceae* L.) starch and its application in edible films" Carbohydrate Polymers, vol. 186 (Apr. 15, 2018); pp. 64-72.

Marichelvam et al., "Corn and Rice Starch-Based Bio-Plastics as Alternative Packaging Materials" Fibers, vol. 7 Issue 4 (Apr. 9, 2019); pp. 1-14.

Fu et al., "Effect of Glycerol Content on the Properties of Potato Flour Films" Starch, vol. 73 Issue 5-6 (Feb. 7, 2021); pp. 1-6.

Basiak, Ewelina et al., "How Glycerol and Water Contents Affect the Structural and Functional Properties of Starch-Based Edible Films" Polymers vol. 10,4 412. (Apr. 8, 2018).

International Search Report received in PCT/IB2022/050243, dated Apr. 6, 2022, 2 pages.

Written Opinion received in PCT/IB2022/050243, dated Apr. 6, 2022, 5 pages.

\* cited by examiner

MODIFIED STARCH COMPOSITION

CROSS REFERENCE TO RELATED APPLICATIONS

This is the U.S. National Stage of International Application No. PCT/IB2022/050243 filed Jan. 13, 2022, which was published in English under PCT Article 21(2), which in turn claims the benefit of India Application No. 202141001725, filed in India Jan. 14, 2021. Both applications are incorporated by reference herein in their entirety.

FIELD OF INVENTION

The present disclosure relates to a modified starch composition. Specifically, it relates to a modified starch composition comprising starch and a compatibilizing agent.

BACKGROUND

Biodegradable materials and environmentally friendly alternatives for plastic are increasingly being adopted in various industries, including for example packaging. Starch is easily available, renewable, biodegradable and generally low cost and has been used for preparing biodegradable plastics. However, starch films are brittle and starch, a hydrophilic material, tends to deteriorate on exposure to humidity. These factors make starch unsuitable for preparing biodegradable plastics especially for food packaging.

To overcome such limitations, starch is modified and blended with other polymers. Modification of starch includes for example plasticization and gelatinization that weaken the inter-molecular hydrogen bonding of the starch molecule.

Basiak, Ewelina et al. "How Glycerol and Water Contents Affect the Structural and Functional Properties of Starch-Based Edible Films" Polymers vol. 10,4 412. 8 Apr. 2018, discloses modification of starch using 30% and 50% w/w of glycerol. However, Basiak discloses that such starch is highly soluble in water (solubility≥30%). When such starch is blended with other biodegradable polymers, the resultant polymer composition demonstrates poor mechanical properties at higher percentages of starch.

SUMMARY

The present disclosure relates to a modified starch composition. Said modified starch composition comprises starch and a compatibilizing agent selected from the group consisting of glycerol, glycerin, sorbitol and a combination thereof in a w/w ratio of 2:1 to 4:1, wherein the modified starch composition has a solubility index of less than 15% in water at a temperature of about 80° C., and wherein the thermogravimetric analysis of the modified starch composition shows a characteristic peak at a temperature in the range of 120° C. to 180° C.

DETAILED DESCRIPTION

Figure 1:
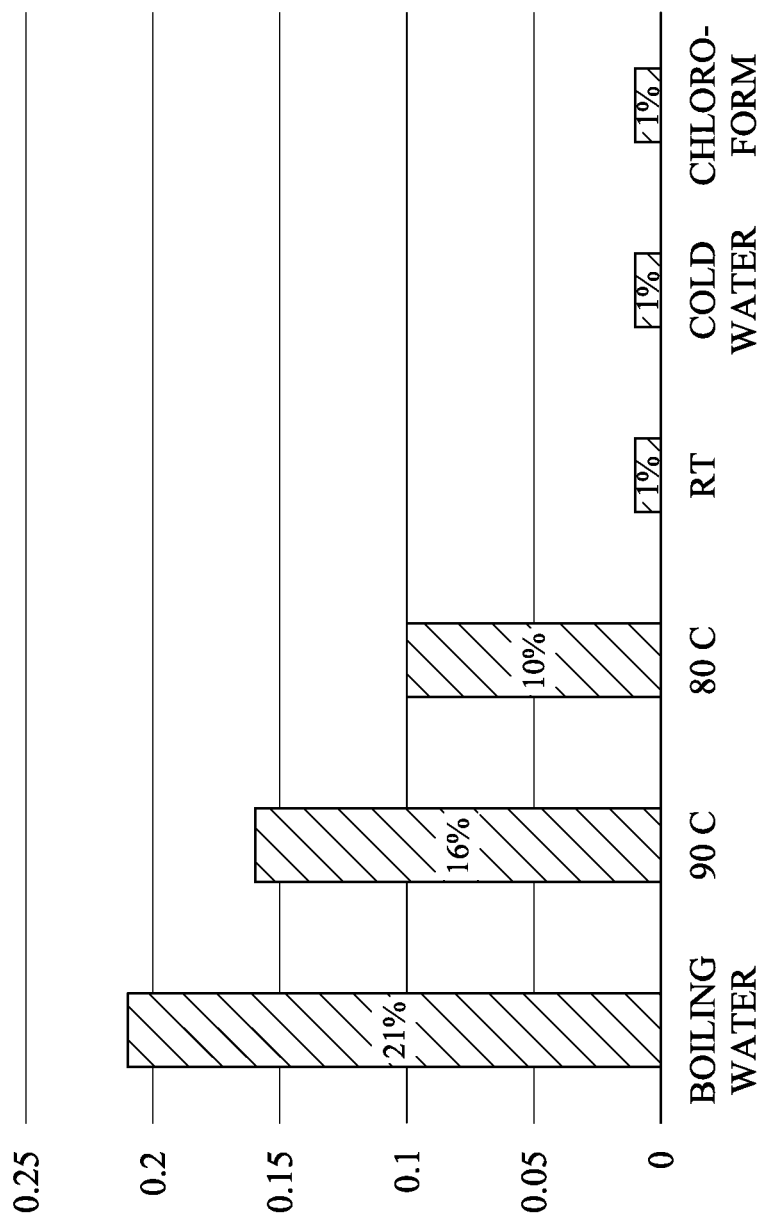
FIG. 1 shows a comparative study of the solubility of the modified starch composition prepared in accordance with an embodiment of the present disclosure.

For the purpose of promoting an understanding of the principles of the disclosure, reference will now be made to embodiments and specific language will be used to describe the same. It will nevertheless be understood that no limitation of the scope of the disclosure is thereby intended, such alterations and further modifications in the disclosed composition and method, and such further applications of the principles of the disclosure therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof.

Reference throughout this specification to "one embodiment", "an embodiment" or similar language means that a particular feature, structure, or characteristic described in connection with the embodiment is included in at least one embodiment of the present disclosure. Thus, appearances of the phrase "in one embodiment", "in an embodiment" and similar language throughout this specification may, but do not necessarily, all refer to the same embodiment.

The terms "a," "an,", and "the" are used to refer to "one or more" (i.e. to at least one) of the grammatical object of the article.

The terms "comprises", "comprising", or any other variations thereof, are intended to cover a non-exclusive inclusion and are not intended to be construed as "consists of only", such that a process or method that comprises a list of steps does not include only those steps but may include other steps not expressly listed or inherent to such process or method.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described.

"Solubility index" as stated herein refers to a measurement of solubility of modified starch composition in a given solvent. It is calculated as a percentage of the original weight of the sample, for instance, the water solubility index (WSI) is expressed as:

$$WSI(\%) = \frac{\text{Weight of dissolved solid in water}}{\text{Weight of dry solids.}} \times 100$$

The present disclosure relates to a modified starch composition comprising starch and a compatibilizing agent selected from the group consisting of glycerol, glycerin, sorbitol and a combination thereof in a w/w ratio of 2:1 to 4:1, wherein the modified starch composition has a solubility index of less than 15% in water at a temperature of about 80° C., and wherein the thermogravimetric analysis of the modified starch composition shows a characteristic peak at a temperature in the range of 120° C. to 180° C.

The modified starch composition of the present disclosure is hydrophobic and is substantially insoluble in water such that good physical integrity is maintained even after immersion in water. It is understood that this solubility behavior is observed due to the saturated inter-molecular hydrogen bonding between starch and the compatibilizing agent during thermo-mechanical mixing of starch and the compatibilizing agent in accordance with the teachings of present disclosure.

In accordance with an aspect, the disclosed modified starch composition is insoluble in cold water. Cold water refers to water maintained at a temperature of 10° C.

In accordance with an aspect, the modified starch composition has a solubility index in the range of 1%-5% in water kept at room temperature of about 25° C.

In accordance with an aspect, the modified starch composition has a solubility index in the range of 17%-35% in boiling water (at 100° C.).

In accordance with an aspect, the modified starch composition has a solubility index in the range of 1%-5% in chloroform.

In accordance with an aspect, the thermogravimetric analysis of the modified starch composition shows a characteristic peak at a temperature between 120° C. -180° C. In an embodiment, the characteristic peak is obtained at temperature of 150° C.

In accordance with an embodiment, the modified starch composition has a moisture content in the range of 0.4-0.9%. In some embodiments, the modified starch composition has a moisture content of 0.6-0.7%.

In accordance with an embodiment, the modified starch composition comprises starch and the compatibilizing agent in a w/w ratio of 2:1-4:1. In some embodiments, the w/w ratio of starch and the compatibilizing agent is 2:1-3.5:1. In an exemplary embodiment, the w/w ratio of starch and the compatibilizing agent is 3.3:1 to 3.4:1 and in particular 3.34:1. FIG. 1 shows a comparative study of the solubility of the modified starch composition, when the w/w ratio of starch and compatibilizing agent (glycerol) is 3.34:1. The solubility studies were performed in cold water at a temperature of 10° C., water at room temperature, water a temperature of 80° C. and 90° C., boiling water, and in chloroform.

In accordance with an embodiment, starch and the compatibilizing agent are in a molar ratio of 2:1.

Any known source of starch may be used. In accordance with an embodiment, the starch is a natural starch and is selected from the group consisting of potato, wheat, corn, cassava, rice, peas starch and a combination thereof. In accordance with an embodiment, the starch is a chemically or physically modified starch, selected from the group consisting of oxidised, carboxymethylated, hydroxyalkylated, enzymatically treated starch, and combinations thereof. In some embodiments, a blend of natural as well as chemically or physically modified starch is used.

The compatibilizing agent is selected from the group consisting of glycerol, glycerin, sorbitol and combinations thereof. In some embodiments, the compatibilizing agent is glycerol.

In a further embodiment, the modified starch composition comprises additives such as fillers, emulsifiers, fragrance, essential oils, fatty acids. Any known fillers may be used. In accordance with an embodiment, the fillers are selected from the group consisting of calcium carbonate, calcium oxides, coco peat, and a combination thereof. Any known emulsifier may be used. In accordance with an embodiment, the emulsifier is selected from the group consisting of tween 20, glycerol monostearate, alcohol ester and a combination thereof.

In accordance with an embodiment, the modified starch composition is in the form of a cast film. In accordance with an embodiment, the modified starch composition is extruded in the form of a pellet.

A process for preparing the modified starch composition is also disclosed. Said process comprises preparing a blend comprising starch and the compatibilizing agent in a w/w ratio ranging between 2:1 to 4:1, processing the blend comprising starch and the compatibilizing agent in a twin-screw processor at a barrel temperature ranging between 60-110° C.; and obtaining the modified starch composition from the twin-screw processor. The process conditions disclosed herein, as well as the ratio of starch and the compatibilizing agent provide mechanical and thermal interaction such that a modified starch is obtained which is substantially insoluble in cold water, water at room temperature as well as chloroform.

In accordance with an embodiment, the blend comprising starch and the compatibilizing agent is prepared at room temperature of about 25-35° C. In accordance with an embodiment, the blend comprising starch and the compatibilizing agent is prepared without the addition of water. In accordance with an embodiment, the processing of the blend comprising starch and the compatibilizing agent in the twin-screw processor is carried out without the addition of water. In accordance with an embodiment, said blend is prepared in any known mixer. In some embodiments, said blend is prepared in a ribbon mixer.

The blend comprising starch and the compatibilizing agent is processed through the twin-screw processor at a temperature ranging between 60-110° C. In some embodiments, the blend is processed at the temperature ranging between 60-100° C.

In accordance with an embodiment, the blend comprising starch and the compatibilizing agent is fed to the twin-screw processor at a feeding rate of 30-100 Kg/hr. In accordance with an embodiment, the twin-screw processor is operated at a screw speed of 80-140 rpm. In some embodiments, the twin-screw processor is operated at a screw speed of 80-120 rpm. In accordance with an embodiment, the twin-screw processor has a length/diameter (L/D) in the range of 60/40. In accordance with an embodiment, the process has a residence time ranging between 1-4 minutes.

In accordance with an embodiment, the twin-screw processor for preparing the modified starch composition is a co-rotating twin-screw processor. In accordance with an embodiment, the co-rotating twin-screw processor is a co-rotating twin-screw extruder. In some embodiments, the twin-screw extruder is Omega 40H or Omega 60H (Steer Engineering Pvt. Ltd.).

A cast film comprising the modified starch composition is also disclosed. Said cast film has a solubility index of less than 15% for water at about 80° C.

A packaging material comprising said modified starch composition is also disclosed. In accordance with an embodiment, said packaging material comprises 30-100% w/w of the modified starch composition.

The modified starch composition could be combined with any known biodegradable polymer such as polybutylene adipate terephthalates (PBATs), polycaprolactones (PCLs), polybutylene succinate adipates (PBSs), polylactic acids (PLAs) to form a biodegradable polymer composition.

In order that this disclosure may be better understood, the following examples are set forth. These examples are for the purpose of illustration only and the exact compositions, methods of preparation and embodiments shown are not limiting of the disclosure.

Also described herein are method for characterizing the modified starch compositions in accordance with one or more embodiments of the present disclosure.

EXAMPLES

Example 1

Process for Preparation of the Exemplary Modified Starch Composition (Starch: Glycerol-3.34:1)

3.34 parts starch and 1 part glycerol were mixed without the addition of water at room temperature in a ribbon mixer. The blend comprising starch and the compatibilizing agent was fed and conveyed through a co-rotating twin-screw extruder (Omega 40H (Steer Engineering Pvt. Ltd.)) and the modified starch composition was obtained from the discharge zone of the extruder. The machine specifications and processing conditions are stated in Tables 1 and 2, below.

TABLE 1

| Machine specifications and processing conditions | |
|---|---|
| Machine | Omega 40 |
| Barrel Diameter | 40 mm |
| Each Barrel length | 160 mm |
| Total no. of Barrels | 10 |
| Total Length of Barrel | 1600 mm |
| Machine L/D | 60/40 |
| Screw Speed | 80 rpm |
| Screw Configuration | As illustrated in Table 2 |
| Feed Rate of blend comprising starch and glycerol | 60 Kg/hr |
| Barrel temperature | 60-120° C. |

TABLE 2

| Screw Configuration* | | |
|---|---|---|
| Sl. No | Type of element | Quantity |
| 1 | RSC38/38 | 1 |
| 2 | SKE 60/60 | 3 |
| 3 | RSC38/38 | 3 |
| 4 | RSC 50/50 | 1 |
| 5 | RK 45/5-50 | 2 |
| 6 | SKE 60/60 | 3 |
| 7 | RSC 60/60 | 1 |
| 8 | RSC 38/38 | 5 |
| 9 | RK45/5-50 | 2 |
| 10 | RSC 40/40 | 1 |
| 11 | RSC60/60 | 1 |
| 12 | SKE 60/60 | 1 |
| 13 | RSC 60/60 | 2 |
| 14 | RSC 50/50 | 4 |
| 15 | SKE 60/60 | 2 |
| 16 | RSC 38/38 | 4 |

Figure 2:
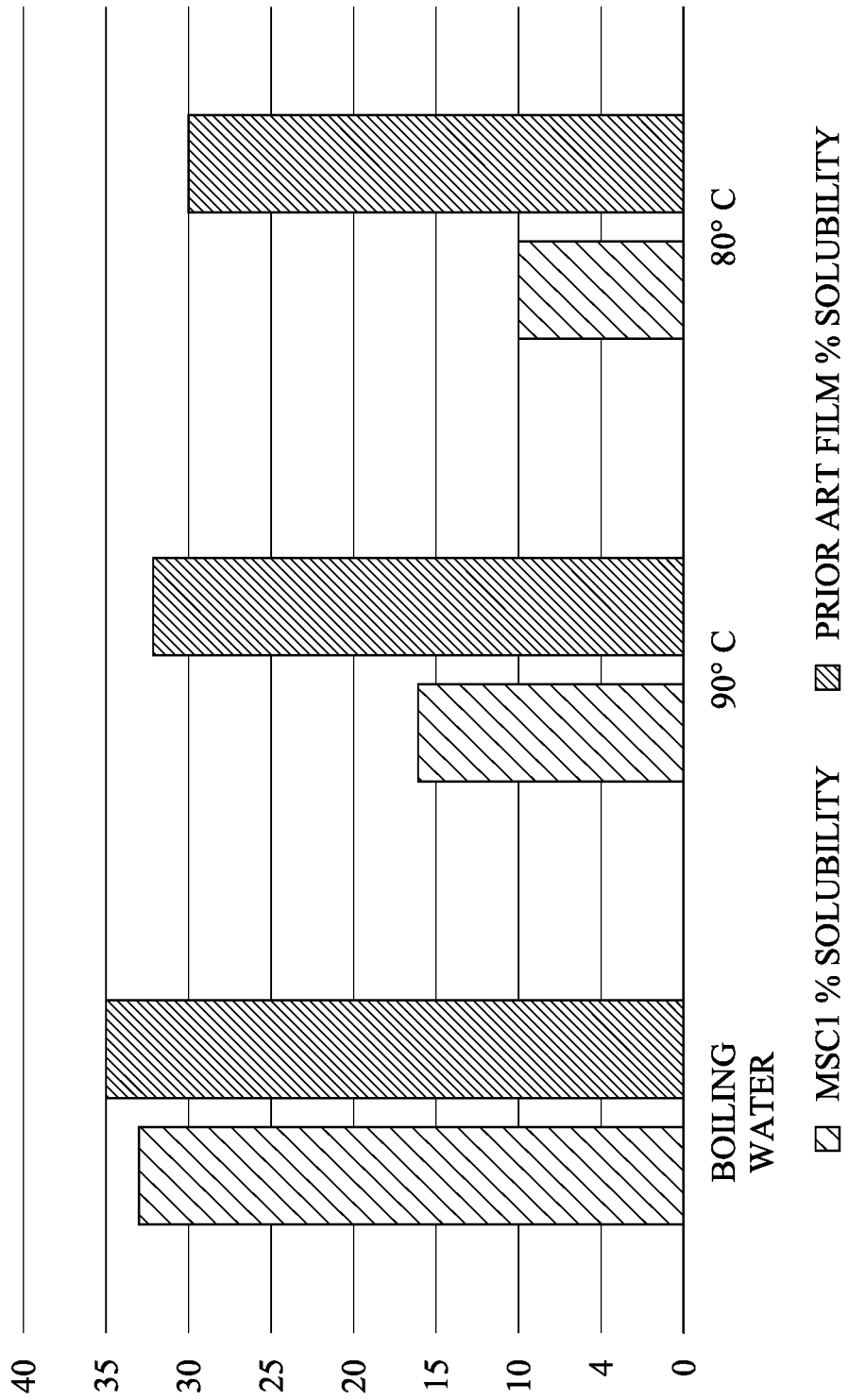
FIG. 2 shows a comparative study of the solubility of the modified starch composition prepared in accordance with an embodiment of present disclosure vis-à-vis conventional cast film, in water at various temperatures.

*List of Abbreviations for Elements
RSC Right-Handed Screw Element
SKE Schubkanten Element
RK Right-Handed Kneading Block The obtained composition was cast in the form of a film and solubility studies were performed on the obtained film as well as a conventional cast film comprising 30% w/w of glycerol, prepared in accordance with Farahnaky et al. Effect of Glycerol On Physical And Mechanical Properties Of Wheat Starch Edible Films. Journal of Texture Studies 44 (2013) 176-186. FIG. 2 shows a comparative study of the solubility of the modified starch obtained in accordance with an embodiment of present disclosure vis-à-vis said conventional cast film.

Observation: It was observed that while the modified starch composition (MSC1) in accordance with the present disclosure resulted in a material that was hydrophobic and did not solubilize in water, the conventional cast film dissolved in water at 80° C. and any increase in temperature. Particularly, the conventional film showed solubility of 30% at 80° C. Thus, contrary to the conventional film, the disclosed film of modified starch composition resisted and retained its nature and was not soluble in water. This could be explained on account of the saturated hydrogen bonding in the disclosed modified starch composition.

Example 2

Thermogravimetric Analysis of the Exemplary Modified Starch Composition

Figure 3:
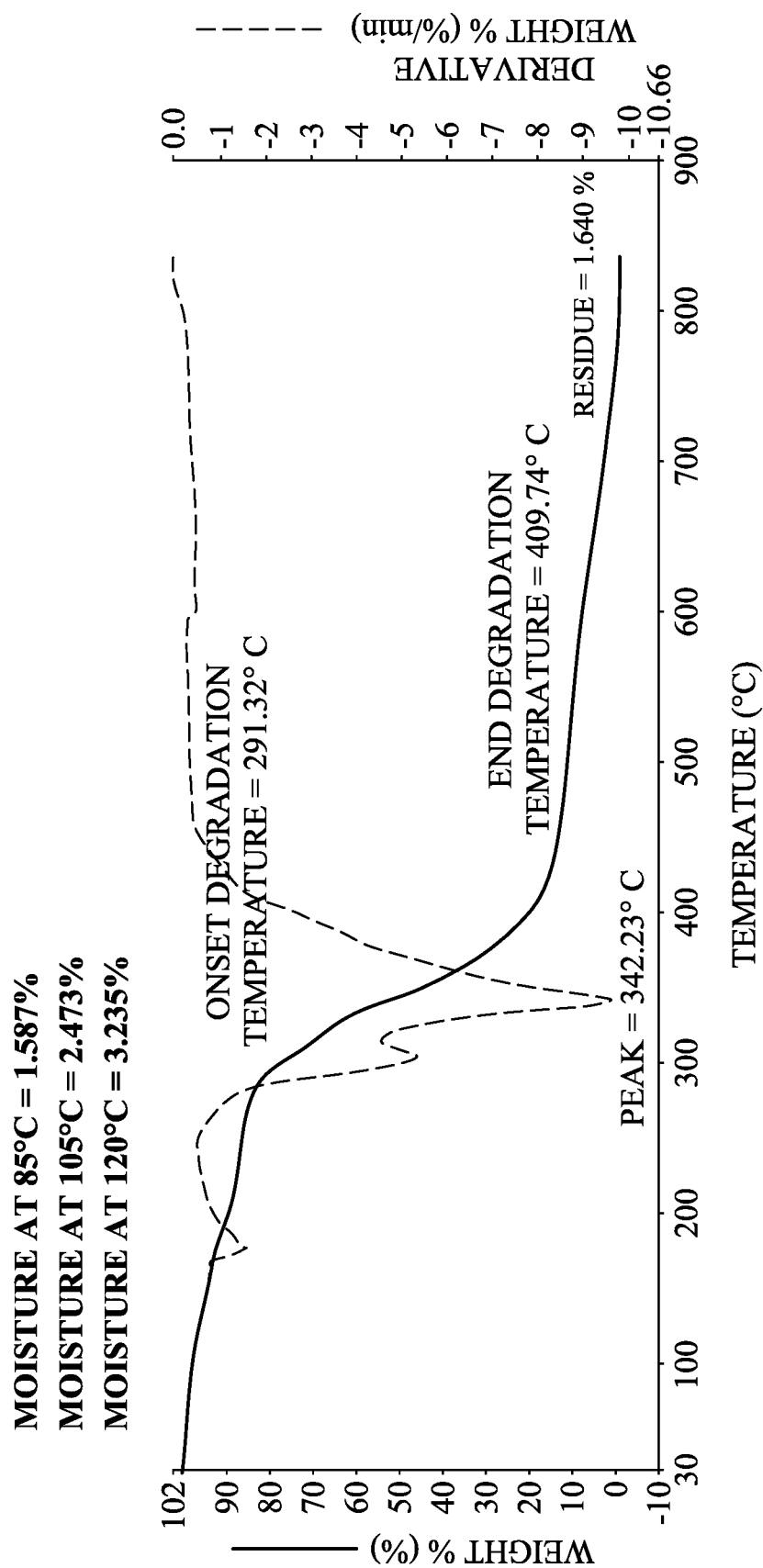
FIG. 3 shows the thermogravimetric analysis of the modified starch composition, prepared in accordance with an embodiment of the present disclosure.

The process of Example 1 was repeated to obtain pellets of modified starch composition. The thermogravimetric analysis (TGA) of the pellets of the modified starch composition was then performed. The thermogravimetric analysis was conducted in a thermogravimetric analyser (Perkin Elmer TGA 4000) under a nitrogen atmosphere at a heating rate of 10° C. per minute. The change in weight as a function of temperature was recorded. FIG. 3 shows the thermogravimetric analysis of the obtained modified starch composition. A characteristic peak was observed at a temperature of 150° C.

Example 3

Mechanical Properties of a Blend of the Modified Starch Composition and a Biodegradable Polymer-PBAT Preparation of biodegradable polymer composition: The ingredients used to form the exemplary biodegradable polymer composition (BPC1) are listed in Table 3, below.

TABLE 3

| Ingredients for preparing exemplary biodegradable polymer composition | |
|---|---|
| Ingredients | Quantity (%) |
| Starch | 38.5 |
| Glycerol | 11.5 |
| PBAT | 50 |

The biodegradable polymer composition was prepared by first preparing a blend comprising starch and a compatibilizing agent at room temperature in a ribbon mixer. The blend comprising starch and the compatibilizing agent was fed and conveyed through a twin-screw extruder to obtain the modified starch composition. PBAT was fed to the twin-screw extruder through a side feeder. The modified starch and PBAT was conveyed through the twin-screw extruder and the biodegradable polymer composition—BPC1 was obtained from the discharge zone of the twin-screw extruder.

The mechanical properties of this biodegradable polymer composition were compared with that of PBAT/thermoplastic starch blends disclosed in Can et al. (PBAT/thermoplastic starch blends: "Effects of oxidized starch and compatibilizer content"; AIP Conference Proceedings 1914, 070004 (2017)). Table 4 shows a comparison of the mechanical properties of biodegradable polymer composition with this prior art polymer composition.

TABLE 4

Comparison of mechanical properties

| Properties | BPC1 | Can et al. (50/50 PBAT/TPS) |
|---|---|---|
| Tensile Modulus, MPa | 83 | 74.7 |
| Tensile Strength, MPa | 10.25 | 6.5 |
| Notched Izod Impact Strength, kJ/m$^2$ | 31.60 | 2.5 |
| Elongation at break, % | >300 | 17.7 |

Observation: It was observed that the biodegradable polymer composition comprising the disclosed modified starch exhibits significant improvement in mechanical properties when compared with prior known blends of PBAT and starch at same w/w ratio.

INDUSTRIAL APPLICABILITY

The disclosed modified starch composition is highly stable, insoluble in water and exhibits minimal or zero hydrophilic properties, while demonstrating a high degree of biodegradability. The modified starch composition finds applications as a food-grade biodegradable packaging material. Thus, the modified starch composition provides an alternative to fossil fuel-based plastic in food and non-food applications.

The modified starch composition is susceptible to both aerobic and anaerobic decomposition.

The modified starch composition can be combined with a biodegradable polymer such as polybutylene adipate terephthalates (PBATs), polycaprolactones (PCLs), polybutylene succinate adipates (PBSs), polylactic acids (PLAs) to form a biodegradable polymer composition. Such biodegradable polymer finds application as, but is not limited to, straws, drinking bottles, and carry bags for instance.

The disclosed modified starch composition enables preparing biodegradable polymer compositions comprising higher proportions of starch (greater than 50%) while exhibiting significant improvement in mechanical properties. Thus, the disclosed modified starch composition reduces cost of preparing biodegradable polymer compositions.

We claim:

1. A modified starch composition comprising starch and a compatibilizing agent selected from the group consisting of glycerol, glycerin, sorbitol and a combination thereof in a w/w ratio of 2:1 to 4:1,
    wherein the modified starch composition has a solubility index of less than 15% in water at a temperature of 80° C., and
    wherein thermogravimetric analysis of the modified starch composition shows a characteristic peak at a temperature in the range of 120° C. to 180° C.

2. The composition as claimed in claim 1, wherein the starch and the compatibilizing agent are in the w/w ratio of 3.34:1.

3. The composition as claimed in claim 1, wherein starch and the compatibilizing agent are in a molar ratio of 2:1.

4. The composition as claimed in claim 1, wherein the starch is a natural starch selected from the group consisting of potato, wheat, corn, cassava, rice, peas starch and a combination thereof.

5. The composition as claimed in claim 1, wherein the starch is a chemically or physically modified starch, selected from the group consisting of oxidised, carboxymethylated, hydroxyalkylated, enzymatically treated starch.

6. The composition as claimed in claim 1, wherein the compatibilizing agent is glycerol.

7. The composition as claimed in claim 1, wherein the modified starch composition has a solubility index of less than 5% in cold water.

8. The composition as claimed in claim 1, wherein the modified starch composition has a solubility index of less than 5% in chloroform.

9. The composition as claimed in claim 1, further comprising an additive selected from the group consisting of fillers, emulsifiers, fragrances, essential oils, fatty acids and a combination thereof.

10. The composition as claimed in claim 1, wherein the modified starch composition is in the form of pellets.

11. The composition as claimed in claim 1, wherein the modified starch composition is in the form of a cast film.

12. A cast film comprising the modified starch composition as claimed in claim 1, wherein the cast film has a solubility index of less than 15% in water at a temperature of 80° C.

* * * * *